(12) United States Patent
Hannewald et al.

(10) Patent No.: US 7,237,529 B2
(45) Date of Patent: Jul. 3, 2007

(54) THROTTLE VALVE POSITIONING DEVICE

(75) Inventors: Thomas Hannewald, Griesheim (DE); Stefan Koehler, Frankfurt am Main (DE)

(73) Assignee: Siemens AG, München (DE)

( * ) Notice: Subject to any disclaimer, the term of this patent is extended or adjusted under 35 U.S.C. 154(b) by 0 days.

(21) Appl. No.: 10/555,453

(22) PCT Filed: May 28, 2004

(86) PCT No.: PCT/EP2004/050958

§ 371 (c)(1),
(2), (4) Date: Nov. 2, 2005

(87) PCT Pub. No.: WO2004/113702

PCT Pub. Date: Dec. 29, 2004

(65) Prior Publication Data
US 2006/0048747 A1   Mar. 9, 2006

(30) Foreign Application Priority Data
Jun. 16, 2003 (DE) .................................. 103 27 045

(51) Int. Cl.
F02D 11/10 (2006.01)
F02D 9/08 (2006.01)

(52) U.S. Cl. ....................... 123/337; 123/399

(58) Field of Classification Search ............... 123/336, 123/337, 361, 399, 403; 251/304–308
See application file for complete search history.

(56) References Cited

U.S. PATENT DOCUMENTS

| 1,671,069 | A |  | 5/1928 | De Wein |
| 2,934,312 | A |  | 4/1960 | Stevens |
| 3,260,502 | A |  | 7/1966 | Plumer |
| 3,556,475 | A |  | 1/1971 | Olenik |
| 3,627,261 | A | * | 12/1971 | Ludeman ................ 251/305 |
| 4,344,396 | A | * | 8/1982 | Yamada .................. 123/337 |
| 4,899,984 | A |  | 2/1990 | Strickler et al. |
| 5,687,691 | A |  | 11/1997 | Kaiser et al. |
| 6,354,267 | B1 |  | 3/2002 | Kotchi et al. |
| 6,435,473 | B1 |  | 8/2002 | Dall'Osso et al. |
| 6,491,020 | B2 |  | 12/2002 | Kotchi et al. |
| 6,557,523 | B1 | * | 5/2003 | Bos et al. .............. 123/337 |
| 6,598,854 | B1 | * | 7/2003 | Jessberger et al. ...... 123/337 |

(Continued)

FOREIGN PATENT DOCUMENTS

DE           307 827           9/1918

(Continued)

OTHER PUBLICATIONS

Abstract—DE 1 082 782 A Jun. 2, 1960 David S. Wiseman & Sons Limited; Frank Edward Swain.

(Continued)

Primary Examiner—Willis R. Wolfe, Jr.

(57) ABSTRACT

A throttle valve positioning device is disclosed, The device has a housing with a bearing for a throttle valve shaft and a throttle valve support, within which a throttle valve pivots which sits on the throttle valve shaft, running into a shaft passage in the support. With the device, air leakage may be avoided, such that the periphery of the throttle valve is arranged at a separation from a passage for the throttle valve shaft in. the throttle valve support.

20 Claims, 3 Drawing Sheets

U.S. PATENT DOCUMENTS

| | | |
|---|---|---|
| 6,604,516 B1 | 8/2003 | Krimmer et al. |
| 6,646,395 B2 | 11/2003 | Reimann |
| 6,722,137 B2 * | 4/2004 | Proctor et al. ............. 123/337 |
| 6,889,652 B2 | 5/2005 | Meiwes et al. |
| 2001/0030518 A1 | 10/2001 | Reimann |
| 2002/0162985 A1 | 11/2002 | Krause et al. |
| 2004/0149257 A1 * | 8/2004 | Meiwes et al. ............. 123/337 |
| 2004/0163703 A1 | 8/2004 | Werder |
| 2005/0199850 A1 | 9/2005 | Hannewald |

FOREIGN PATENT DOCUMENTS

| | | |
|---|---|---|
| DE | 1 082 782 A | 6/1960 |
| DE | 1 297 426 B1 | 6/1969 |
| DE | 1 939 566 A1 | 2/1971 |
| DE | 84 03 653 U1 | 6/1985 |
| DE | 35 16 573 A1 | 11/1986 |
| DE | 43 37 975 A1 | 5/1995 |
| DE | 195 10 622 A1 | 9/1996 |
| DE | 199 34 113 A1 | 1/2001 |
| DE | 101 14 994 A1 | 10/2001 |
| DE | 100 35 607 A1 | 2/2002 |
| DE | 101 42 452 A1 | 3/2003 |
| DE | 102 51 293 A1 | 5/2004 |
| EP | 1 098 079 A1 | 5/2001 |
| EP | 1 126 146 A2 | 8/2001 |
| EP | 1 298 299 A2 | 2/2003 |
| GB | 2 172 381 A | 9/1986 |
| JP | 03160124 A1 | 7/1991 |

OTHER PUBLICATIONS

Derwent Abstract—DE 199 34 113 A1 Jan. 25, 2001 Robert Bosch GmbH, 70469-Stuttgart, GERMANY.
Derwent Abstract—DE 195 10 622 A1 Sep. 26, 1996 Robert Bosch GmbH, 70469-Stuttgart, GERMANY.
Derwent Abstract—DE 102 51 293 A1 May 13, 2004 Siemens Aktiengesellschaft, 80333-München, GERMANY.
Derwent Abstract—DE 101 14 994 A1 Oct. 4, 2001 BorgWarner Inc., Troy, Mich., US.
Derwent Abstract—DE 100 35 607 A1 Feb. 7, 2002 Robert Bosch GmbH, 70469-Stuttgart, GERMANY.
Derwent Abstract—DE 43 37 975 A1 May 11, 1995 Neumo Armaturen-Apparatebau-Metallgießerei GmbH + Co KG, 75438-Knittlingen, GERMANY.
Derwent Abstract—DE 35 16 573 A1 Nov. 13, 1986 Mueller, Fritz, 7118-Ingelfingen, GERMANY.
Abstract—DE 1 939 566 A1 Feb. 18, 1971 Serck Industries Ltd., Birmingham, GB.
Abstract—DE 1 297 426 B1 Jun. 12, 1969 Nitschke, Otto, 2100-Hamburg, GERMANY.
Abstract—DE 307 827 Sep. 12, 1918 Albert Huguenin.
Abstract—DE 84 03 653 U1 Jun. 27, 1985 Guthermuth GmbH, 6000-Frankfurt, GERMANY.
Derwent Abstract—EP 1 298 299 A2 Feb. 4, 2003 Robert Bosch GmbH, 70442-Stuttgart, GERMANY.
Derwent Abstract—EP 1 126 146 A2 Aug. 22, 2001 Mannesmann VDO Aktiengesellschaft, 60388-Frankfurt am Main, GERMANY.
Derwent Abstract—DE 101 42 452 A1 Mar. 20, 2003 Siemens Aktiengesellschaft, 80333-München, GERMANY.

* cited by examiner

THROTTLE VALVE POSITIONING DEVICE

BACKGROUND OF THE INVENTION

The invention relates to a throttle valve positioning device having a housing which forms a bearing arrangement for a throttle valve shaft and comprises a throttle body in which a throttle valve is pivotable, said throttle valve sitting on the throttle valve shaft, which leads through the shaft passage into the throttle body, the housing being of split design, and the circumference of the throttle valve, at least on one side, lying next to the throttle valve shaft at a distance from a passage of the throttle valve shaft in the throttle body.

In the hitherto known arrangements of throttle valves in the throttle body which sit centrally on the throttle valve shaft or in a slot in the throttle valve shaft, leakage air usually cannot be prevented from flowing past in the region between throttle valve shaft, throttle valve and throttle housing and also via the shaft apertures in the bearings. The avoidance of leakage air is made more difficult in particular in split housings having two housing shells, since the parting line of the two housing halves likewise lies in the region of the throttle valve, so that, on account of the very high vacuum produced in the region of the throttle valve, leakage air is drawn in in this region, which can scarcely be sealed off completely.

It has been attempted hitherto to reduce this problem by minimizing the shaft apertures and the mismatch in mold between the housing halves, it not being possible in this way to absolutely remove the problem, but rather it only being possible to provide for a certain improvement with regard to leakage air at increased production costs.

Throttle valve positioning devices of the type described at the beginning have been disclosed by U.S. Pat. No. 1,671,069, U.S. Pat. No. 3,556,475, U.S. Pat. No. 2,934,312 and U.S. Pat. No. 3,260,502.

SUMMARY OF THE INVENTION

The object of the present invention consists in providing a throttle valve positioning device in which leakage air is minimized.

According to the invention, the object is achieved in that the housing, between its halves, has an actuator and possibly gearing for positioning the throttle valve via the throttle valve shaft.

The displacement of the throttle valve margin away from the shaft passage and from the parting line of a split housing allows the leakage air to be minimized, since a sound seal between the circumference, preferably provided with a sealing ring, of the throttle valve and the inside of the throttle body, it being possible for the inside to be formed without joints away from the shaft passage and a housing parting line. The displacement may be achieved, for example, by a throttle valve attached with lateral offset to the throttle valve shaft, or preferably by the throttle valve lying at an acute angle to the throttle valve shaft, i.e. the throttle valve shaft passes through the throttle valve centrally at an acute angle. An elastic sealing ring, which preferably has certain radial mobility in a circumferential groove, can ensure that the deviations caused by the offset and/or the inclination of the throttle valve are compensated for.

In particular with the last-mentioned possibility, a design which exhibits very little leakage air is possible, in particular if the throttle valve circumference, at least on the side of the throttle valve shaft passage, lies on the suction side in the throttle body. In this design, the passage especially critical for the sealing is arranged toward the drive in a region which lies in front of the throttle valve so that the shaft passage is screened off from the vacuum occurring on the suction side. If, for example, the housing at the same time serves to accommodate an actuator and possibly gearing connected in between, the bottom shell can be designed as a closed-off, airtight unit, and vacuum is on no account applied to the gearbox. This in turn simplifies the sealing of the two housing halves, since the flange length in such positioning devices is relatively large.

With an inclined design of the throttle valve, in the embodiment described above, the shaft bearing arranged opposite the shaft passage lies in the region of the vacuum, a factor which, however, is relatively easy to cope with on this side of the positioning device. Especially preferred is an embodiment in which the throttle valve shaft is mounted at this point in a closed bearing boss, for example directly in the thermoset of the throttle body material.

To avoid passage of air between throttle valve and throttle valve shaft in the case of a throttle valve inclined relative to the shaft, measures for sealing in this region are expedient. The throttle valve itself may consist of a thermoset or of a thermoplastic, for example filled PEI or filled PPS. The throttle valve may be integrally molded on a sleeve which is made of metal or plastic and which completely or partly encloses the shaft and can be secured to the latter in the case of a sleeve made of plastic, said sleeve may in turn also be integrally molded on the throttle valve shaft in one piece with the throttle valve, whereas in the case of metallic sleeves, said sleeves are preferably screwed to the throttle valve shaft or are welded to the latter.

BRIEF DESCRIPTION OF THE SEVERAL VIEWS OF THE DRAWINGS

Exemplary embodiments of the invention are dealt with in more detail below with reference to the attached drawings, in which.

DETAILED DESCRIPTION OF THE INVENTION

Figure 1:
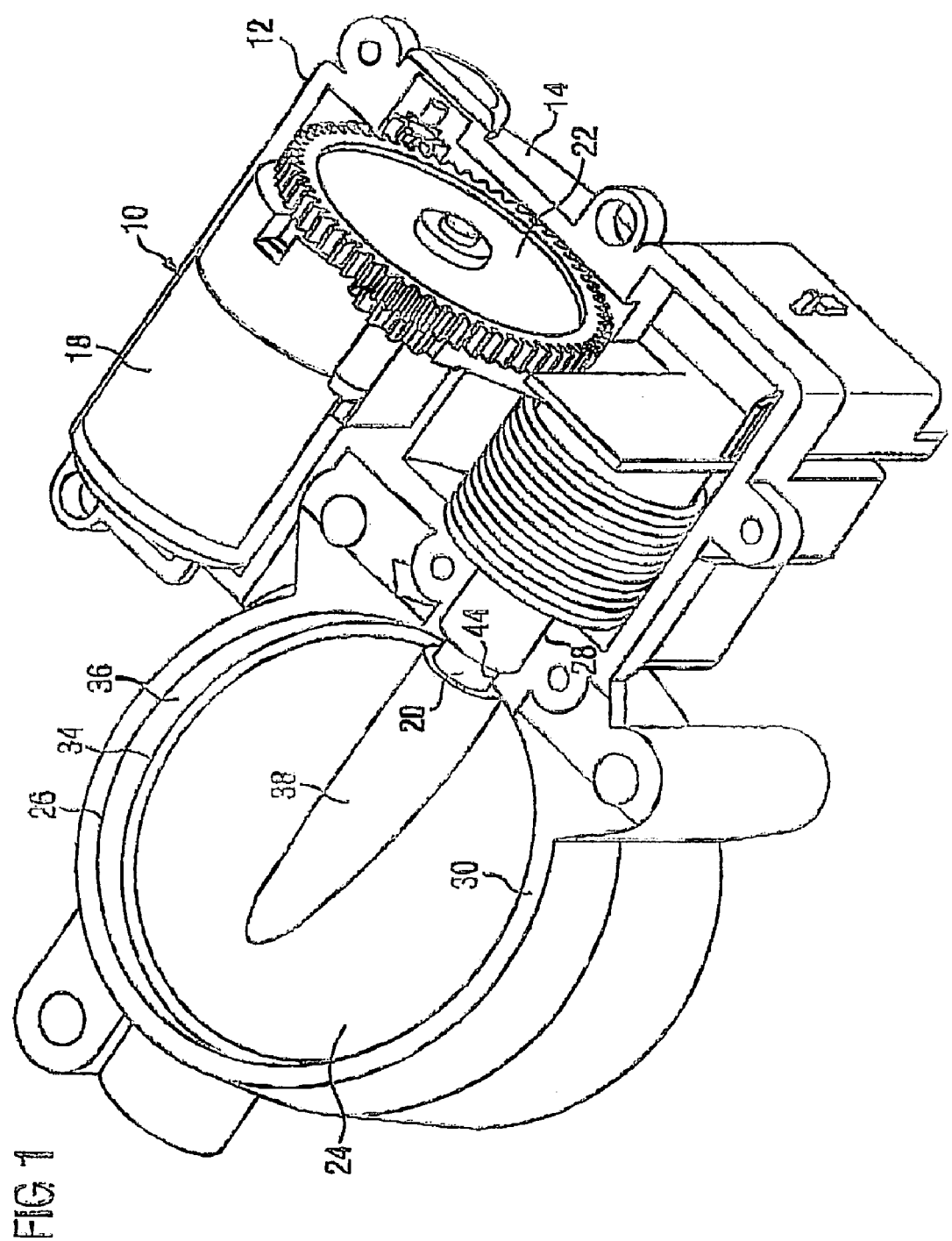
FIG. 1 shows an oblique view of a throttle valve positioning device, with top housing half removed.

Shown in FIG. 1 is a throttle valve positioning device 10 which essentially comprises a housing 12 with a bottom housing half 14 and a top housing half 16, an actuator 18, a throttle valve shaft 20, which is coupled to the actuator 18 via gearing 22, and a throttle valve 24 which sits on the throttle valve shaft 20 and is pivotable in a throttle body 26 formed by the two housing halves 14, 16. In addition to a receptacle for the actuator 18 and the gearing 22, the housing also forms a bearing arrangement for the throttle valve shaft 20 at a first, drive-side bearing 28 in the parting line 30 between the two housing halves 14, 16 and at a second bearing 32 on the side opposite the drive in the throttle body 26. The second bearing 32 is at a distance from the parting line 30 between the housing halves and may also be designed as a closed bearing boss, whereas in FIG. 2 the bearing 32 is shown open outward.

The actuator 18 and the gearing 22 and also those regions of the two housing halves 14, 16 which enclose them are designed in a manner known per se and are therefore slot to be discussed in more detail here.

In deviation from conventional solutions, the throttle valve 24 does not sit centrally on the throttle valve shaft or in a split throttle valve shaft, but rather is designed to be offset relative to the throttle valve shaft in such a way that the circumference 34 of the throttle valve 24 bears next to the throttle valve shaft 20 on the inside against the throttle body 26. To this end, in the exemplary embodiment shown, the throttle valve 24 is arranged inclined relative to the throttle valve shaft 20, an angular range of between 5° and 25° being expedient. In the contact region of the circumference 34 of the throttle valve 24, the throttle body 26 is formed with a correspondingly inclined region 36, the walls of which lie perpendicularly to the plane defined by the throttle valve 24 in its completely closed position. The adaptation of the wall of the throttle body to the inclination of the throttle valve relative to the throttle valve shaft reduces the actuating forces and avoids jamming in the closed position.

Figure 2:
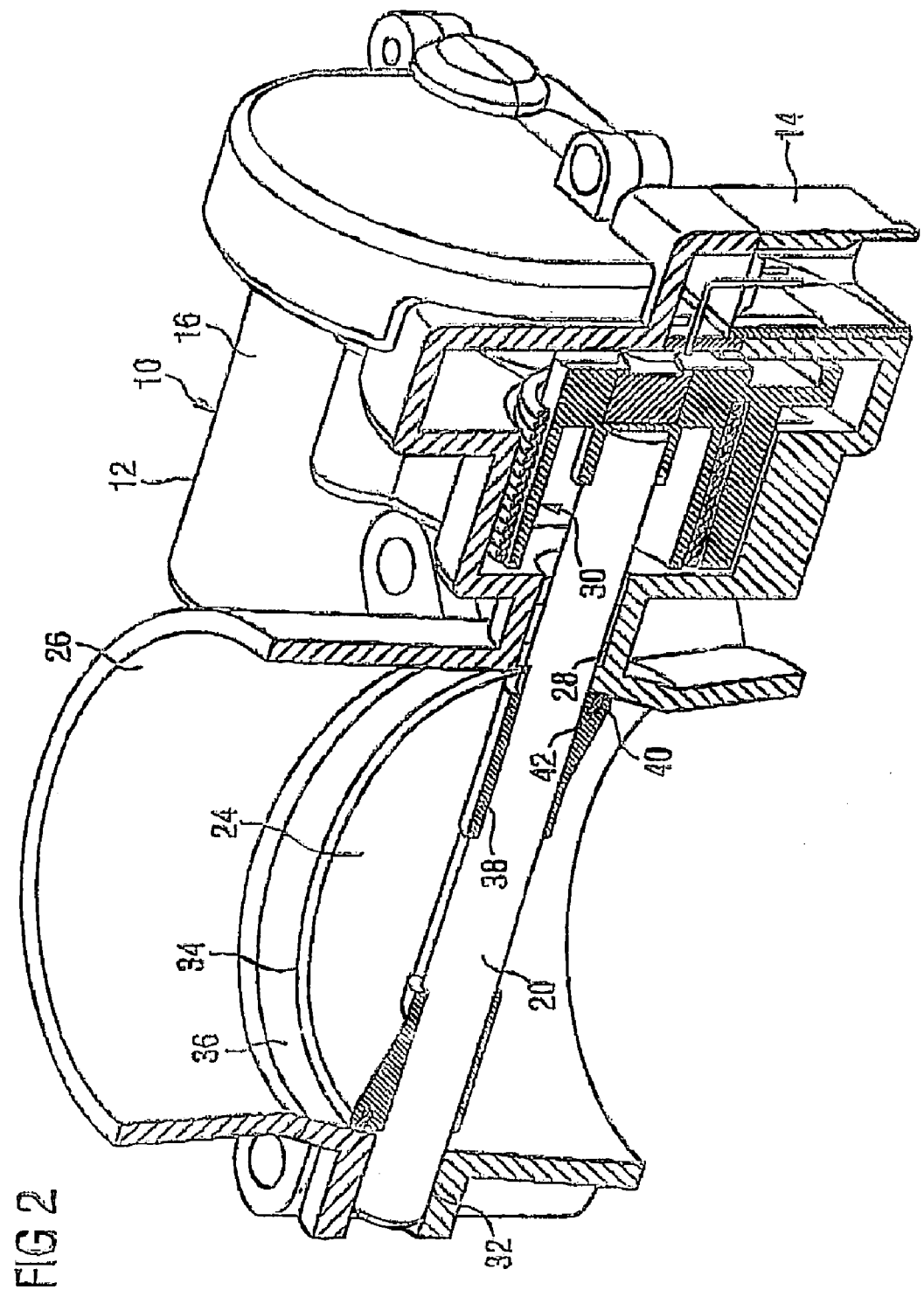
FIG. 2 shows a sectional illustration of the throttle valve positioning device according to FIG. 1, with housing top part.

In the exemplary embodiment shown in FIGS. 1 and 2, the inclined region 36 is formed essentially by the bottom housing half 14, i.e., in the closed position of the throttle valve, the inclined region 36, which together with the throttle valve provides for the sealing, is designed without joints. This provides for an excellent sealing effect, so that the leakage air is reduced to a minimum.

The throttle valve 24 is connected to the shaft in a rotationally fixed manner by means of a sleeve 38, it being possible for the throttle valve to be integrally molded with the sleeve directly on the throttle valve shaft 20, which is made of steel, or for it to be secured to the shaft via a metal insert which is welded or screwed to the shaft. In the solution with a metal insert, the throttle valve can again be integrally molded on said metal insert. Suitable materials for the body of the throttle valve are thermosetting plastic or thermoplastic, such as, for en-ample, filled PEI (polyether imide) or filled PPS (polyphenylene sulfide).

To improve the sealing between throttle valve and throttle body 26, a piston ring or sealing ring 40, which can be made of an elastic plastic, for example PEEK (polyaryletherketone, polyetheretherketone) with PTFE filling or pure PTFE, is embedded in the circumference 34 of the throttle valve 24. This piston ring 40 is held in a circumferential groove 42, which is designed to be so deep that the piston ring 40 can be pressed in elastically in the radial direction. The radial mobility of the elastic piston ring 40 and its inherent elasticity ensure that the deviations of the path of movement, which are caused by the inclination of the throttle valve, during the pivoting of the throttle valve are compensated for, so that an optimum sealing effect can nonetheless be achieved. Furthermore, the piston ring 40 is suitable for compensating for production tolerances, so that the latter likewise cannot be the cause of leakage air.

Due to the special arrangement of the throttle valve 24 in the throttle valve positioning device 10 shown in FIGS. 1 and 2, the passage 44 of the throttle valve shaft 20 into the throttle body 26 is relieved of vacuum, since the vacuum side, in accordance with the illustration, lies on the fresh-air side below the throttle valve 24 and the throttle valve shaft. This means that, in particular the case of a closed design of the second bearing 32, especially sound sealing against leakage air is achieved, since vacuum cannot be applied to the closed housing 12 via the passage location 44. As a result, the sealing of the two housing halves 14, 16 relative to one another is simplified, The two housing halves 14, 16 may be produced from plastic, in particular a thermoset, which is also suitable for directly forming the bearing 32, so that the throttle valve shaft, during assembly, merely needs to be inserted there into the closed bearing boss.

Figure 3:
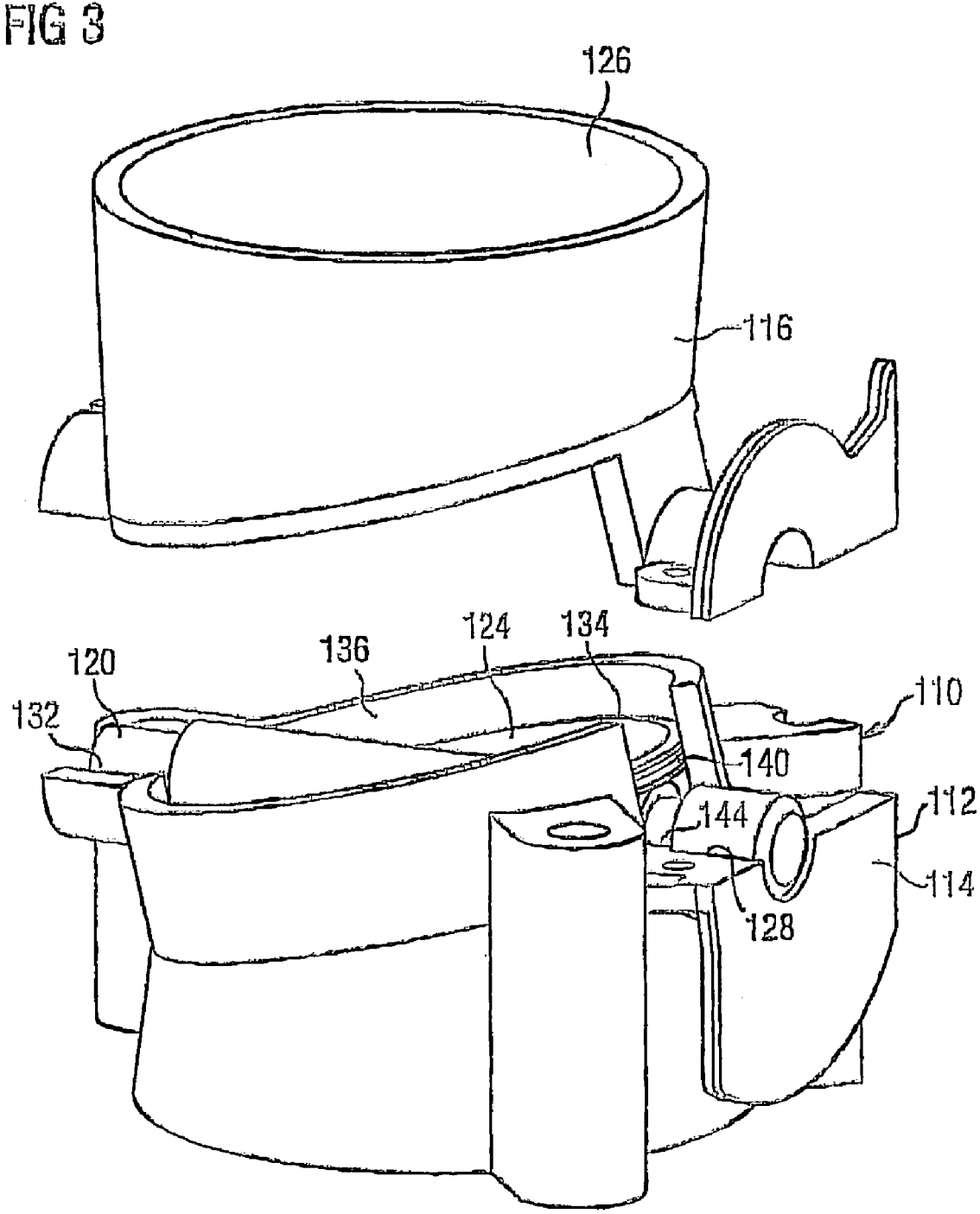
FIG. 3 shows a view of a further embodiment of a throttle valve positioning device, with lifted housing top part.

In the embodiment of a throttle valve positioning device 110 shown in FIG. 3, in which the drive and that region of a housing 112 which surrounds said drive have been omitted, a parting line 130 between the two housing halves 114, 116 runs both through the first drive-side bearing 128 of the throttle valve shaft 120 and through the opposite second bearing 132, i.e. the parting line 130 lies essentially in the plane defined by the position of the throttle valve shaft 120. Only in the region of the throttle body 126 is the parting line 130 designed so as to be inclined in accordance with the inclined region 136, with a slope corresponding to the throttle valve inclination. This makes it necessary for a wall section 150 formed parallel to the flow direction in the throttle body 126 to be provided between the region of the top housing half 116, this region forming part of the throttle body 126, and the remaining housing region, so that two parting lines are produced in the contact region of the sealing ring 140 at the circumference 134 of the throttle valve 120. However, these parting lines are not critical for the sealing on account of their essentially perpendicular course relative to the direction of movement of the sealing ring in this region during the positioning of the throttle valve. The advantage of the embodiment shown in FIG. 3 consists in the simpler assembly, since the unit of drive, gearing, throttle valve shaft and throttle valve, when housing halves 114, 116 are separated, can be inserted into its bearings in a simple manner and the housing 112 can then be closed in a simple manner. The embodiment shown in FIGS. 1 and 2 offers even further improved sealing, with certain difficulty during the assembly on account of the second bearing 32, which is not split, since first of all the throttle valve shaft can be inserted into this bearing and only after that can the unit of gearing and actuator be inserted into the receptacles of the bottom housing half 114.

In principle, further embodiments of the throttle valve positioning devices are conceivable which have the common feature that the throttle valve circumference lies laterally next to the throttle valve shaft, at least in the region of the passage location in the throttle valve shaft, in the throttle body. A simple lateral offset of the throttle valve with respect to the throttle valve shaft without or with only very slight inclination is likewise possible in principle, even though a corresponding adaptation of the inner contour of the throttle body to the path of movement of the pivotable throttle valve could be necessary in this respect in order to achieve a good sealing effect. In principle, it is also conceivable to arrange the drive not directly between the two housing halves but rather at a distance from the throttle valve shaft, so that the two housing halves merely form the throttle body and the bearing arrangement for the throttle valve shaft.

The invention claimed is:

1. A throttle valve positioning device including a housing having two halves and forming a bearing arrangement for a throttle valve shaft, the device comprising:
   a throttle body;
   a throttle valve pivotally arranged within the throttle body; and
   a throttle valve shaft arranged within the body such that the throttle valve sits thereon, the throttle valve shaft arranged to lead through a shaft passage into the throttle body and wherein the circumference of the throttle valve, at least on one side, lies next to the throttle valve shaft at a distance from a passage of the throttle valve shaft in the throttle body;

wherein the housing between its halves, further comprises an actuator for positioning the throttle valve via the throttle valve shaft, wherein the throttle valve is arranged at an acute angle to the throttle valve shaft, and wherein, the throttle body, in the region of the adjoining throttle valve circumference, further comprises a bend whose walls lie perpendicular to a direction of inclination of the throttle valve.

2. The throttle valve positioning device according to claim 1, wherein the acute angle is between 5° and 25°.

3. A throttle valve positioning device including a housing having two halves and forming a bearing arrangement for a throttle valve shaft, the device comprising:

a throttle body;

a throttle valve pivotally arranged within the throttle body and comprising at least one of a thermoset and a thermoplastic; and a throttle valve shaft arranged within the body such that the throttle valve sits thereon, the throttle valve shaft arranged to lead through a shaft passage into the throttle body and wherein the circumference of the throttle valve, at least on one side, lies next to the throttle valve shaft at a distance from a passage of the throttle valve shaft in the throttle body;

wherein the housing, between its halves, further comprises an actuator for positioning the throttle valve via the throttle valve shaft, and wherein the throttle valve is integrally molded on a sleeve made of at least one of metal and plastic and which at least partly encloses the throttle valve shaft and is secured to the latter.

4. The throttle valve positioning device according to claim 3, wherein the sleeve is made of plastic and is integrally molded with the throttle valve on the throttle valve shaft.

5. The throttle valve positioning device according to claim 3, wherein the sleeve is made of metal and is welded to the throttle valve shaft.

6. A throttle valve positioning device including a housing having two halves and forming a bearing arrangement for a throttle valve shaft, the device comprising:

a throttle body;

a throttle valve pivotally arranged within the throttle body; and a throttle valve shaft arranged within the body such that the throttle valve sits thereon, the throttle valve shaft arranged to lead through a shaft passage into the throttle body and wherein the circumference of the throttle valve, at least on one side, lies next to the throttle valve shaft at a distance from a passage of the throttle valve shaft in the throttle body;

wherein the housing, between its halves, further comprises an actuator for positioning the throttle valve via the throttle valve shaft, and wherein a parting line exists between the housing halves outside a contact region of the throttle valve circumference on an inside of the throttle body.

7. The throttle valve positioning device according to claim 6, wherein the throttle valve circumference, at least on the side of the throttle valve shaft passage towards to the drive side, lies on the vacuum side with respect to the throttle valve shaft.

8. The throttle valve positioning device according to claim 6, wherein the throttle valve shaft is mounted in a closed bearing boss on the side of the throttle body a opposite the shaft passage toward the drive.

9. The throttle valve positioning device according to claim 8, wherein the bearing arrangement of the throttle valve shaft is effected directly in the bearing boss of the housing part and wherein the housing comprises plastic such as thermoset.

10. The throttle valve positioning device according to claim 6, wherein the throttle valve is arranged at an acute angle to the throttle valve shaft.

11. The throttle valve positioning device according to claim 10, wherein the acute angle is between 5° and 25°.

12. The throttle valve positioning device according to claim 10, wherein, the throttle body, in the region of the adjoining throttle valve circumference, further comprises a bend whose walls lie perpendicular to a direction of inclination of the throttle valve.

13. The throttle valve positioning device according to claim 6, wherein the throttle valve further comprises a sealing ring arranged at its circumference.

14. The throttle valve positioning device according to claim 13, wherein the sealing ring is held in a circumferential groove in a radially movable manner.

15. The throttle valve positioning device according to claim 13, wherein the sealing ring comprises PEEK with a filling of PTFE or PTFE.

16. The throttle valve positioning device according to claim 6, wherein the throttle valve comprises at least one of a thermoset and thermplastic.

17. The throttle valve positioning device according to claim 16, wherein the throttle valve comprises filled PEI or filled PPS.

18. The throttle valve positioning device according to claim 16, wherein the throttle valve is integrally molded on a sleeve made of at least one of metal and plastic and which at least partly encloses the throttle valve shaft and is secured to the latter.

19. The throttle valve positioning device according to claim 18, wherein the sleeve made of plastic and integrally molded with the throttle valve on the throttle valve shaft.

20. The throttle valve positioning device according to claim 18, wherein the sleeve is made of metal and is welded to the throttle valve shaft.

* * * * *